United States Patent
Itami

(10) Patent No.: US 9,606,753 B2
(45) Date of Patent: Mar. 28, 2017

(54) DATA PROCESSING APPARATUS FOR TRANSMITTING PRINT DATA, METHOD FOR CONTROLLING DATE PROCESSING APPARATUS, AND STORAGE MEDIUM

(71) Applicant: CANON KABUSHIKI KAISHA, Tokyo (JP)

(72) Inventor: Tsuyoshi Itami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/835,499

(22) Filed: Aug. 25, 2015

(65) Prior Publication Data

US 2016/0062709 A1    Mar. 3, 2016

(30) Foreign Application Priority Data

Aug. 28, 2014    (JP) ................................ 2014-174491

(51) Int. Cl.
G06F 3/12          (2006.01)

(52) U.S. Cl.
CPC .......... G06F 3/1205 (2013.01); G06F 3/1204 (2013.01); G06F 3/1253 (2013.01); G06F 3/1285 (2013.01); G06F 3/1292 (2013.01)

(58) Field of Classification Search
None
See application file for complete search history.

(56) References Cited

U.S. PATENT DOCUMENTS

| | | | |
|---|---|---|---|
| 6,236,462 B1* | 5/2001 | Terasaka | G06K 15/00 358/1.12 |
| 2006/0221360 A1* | 10/2006 | Yoshida | G06F 3/1211 358/1.1 |

FOREIGN PATENT DOCUMENTS

JP       2006-142606 A     6/2006

* cited by examiner

*Primary Examiner* — Thomas D Lee
(74) *Attorney, Agent, or Firm* — Canon U.S.A., Inc. IP Division

(57) ABSTRACT

A data processing apparatus starts processing for downloading first print data based on a first print setting from an external apparatus. If a change from the first print setting to a second print setting is received and if second print data based on the second print setting needs to be downloaded from the external apparatus, the data processing apparatus stops the processing for downloading the first print data, starts processing for downloading the second print data from the external apparatus, and then transmits a print job based on the second print data to a printing apparatus. If the second print data does not need to be acquired from the external apparatus, the data processing apparatus transmits a print job based on the first print data and the second print setting to the printing apparatus.

13 Claims, 18 Drawing Sheets

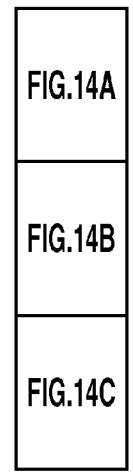
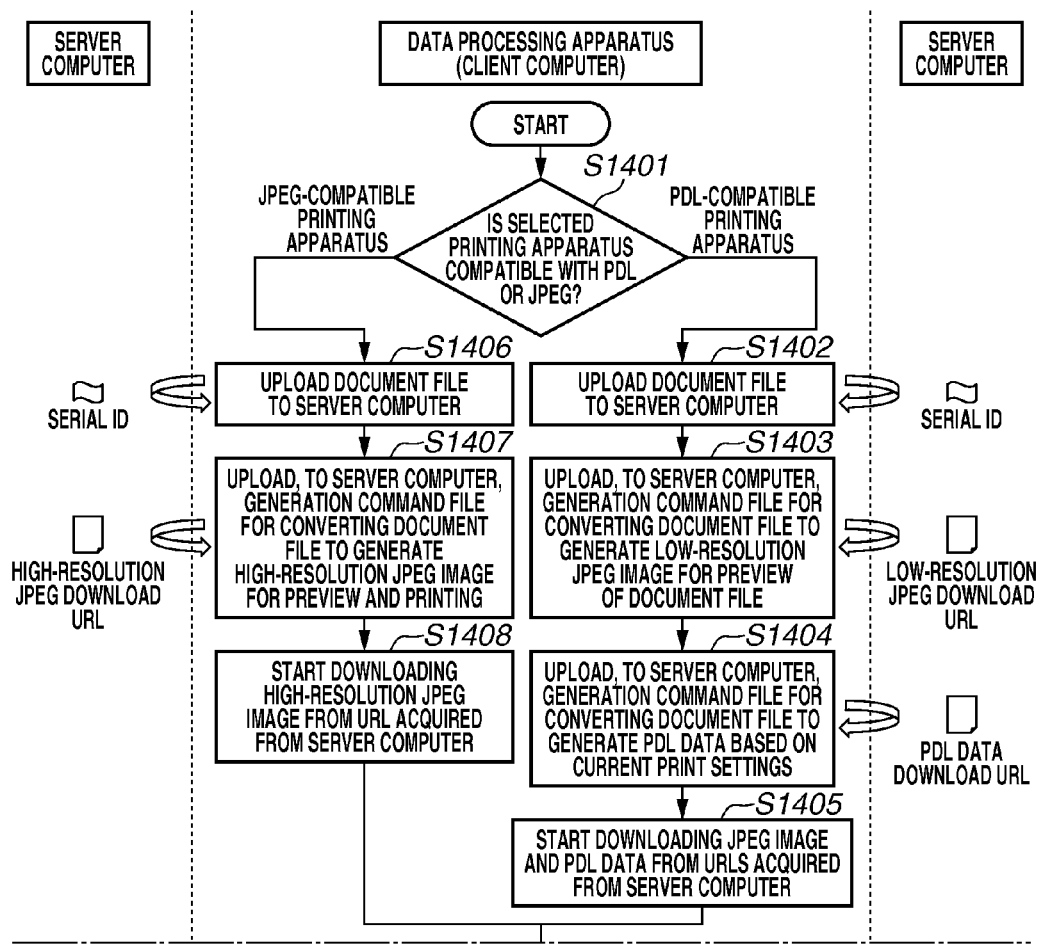
FIG.14A

DATA PROCESSING APPARATUS FOR TRANSMITTING PRINT DATA, METHOD FOR CONTROLLING DATE PROCESSING APPARATUS, AND STORAGE MEDIUM

BACKGROUND

Field

Aspects of the present invention generally relate to a technique for transmitting print data to a printing apparatus.

Description of the Related Art

There have been conventional techniques for downloading print data from a server and then printing the downloaded print data based on settings.

Japanese Patent Application Laid-Open No. 2006-142606 discusses a technique in which a printing apparatus downloads high-resolution data from a server and prints the download high-resolution data if the resolution specified by a mobile electronic device is a high resolution.

SUMMARY OF THE INVENTION

At the time of downloading print data from a server and printing the print data, even after giving an instruction to start downloading the print data, the user may desire to change a print setting before giving an instruction to execute printing.

However, if the configuration is such that the download of print data is started after print settings are confirmed, as discussed in Japanese Patent Application Laid-Open No. 2006-142606, it requires longer time to execute print processing. Further, if a change made by the user to the print settings is within a range having no effect on downloaded print data (for example, if a change is made only to the number of copies and/or a sheet feeding tray), it is efficient to download the print data before a print execution instruction is given.

Aspects of the present invention are generally directed to a printing method in which download of print data is started based on existing print settings and then processing is switched depending on whether print data needs to be re-downloaded based on changed print settings.

According to an aspect of the present invention, a data processing apparatus includes a processing unit configured to start processing for downloading first print data based on a first print setting from an external apparatus, a reception unit configured to receive a change from the first print setting to a second print setting, and a transmission unit configured to transmit to a printing apparatus a print job based on downloaded print data if a print execution instruction is received. If the reception unit receives the change from the first print setting to the second print setting and if second print data based on the second print setting needs to be downloaded from the external apparatus, the processing unit stops the processing for downloading the first print data and starts processing for downloading the second print data from the external apparatus, and the transmission unit transmits a print job based on the second print data to the printing apparatus. If the reception unit receives the change from the first print setting to the second print setting and if the second print data does not need to be acquired from the external apparatus, the transmission unit transmits a print job based on the first print data and the second print setting to the printing apparatus.

Further features of the present disclosure will become apparent from the following description of exemplary embodiments with reference to the attached drawings.

DESCRIPTION OF THE EMBODIMENTS

Figure 1:
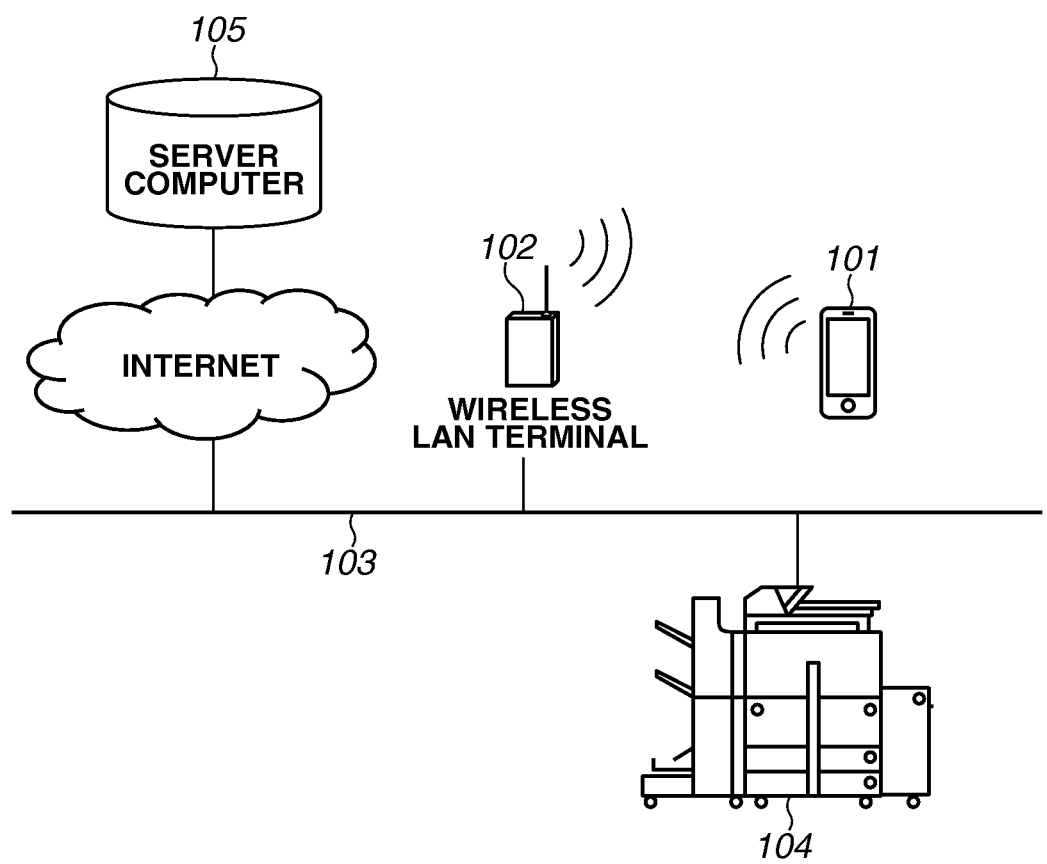
FIG. 1 illustrates a configuration of an entire system.

The present specification will describe a print application for printing using a printing apparatus based on a document file such as a Joint Photographic Experts Group (JPEG) image or a Portable Document Format (PDF) file stored in a mobile terminal such as a smartphone. The print application converts a document file selected by a user into PDL data (print data called "page description language," and examples of a PDL data format include "LIPS," which is a PDL data format for Canon's laser printers) supported by the printing apparatus, adds various types of print setting information (e.g., information about a sheet feeding tray and the number of copies) to the PDL data to generate a print job, and then transmits the generated print job to the printing apparatus, thereby executing print processing.

The present specification will also describe as a function of such a print application a method of developing a document file on a server computer (an external apparatus) located on the Internet or the like instead of generating a print job on a mobile terminal, which has lower performance. This method, in which a document file is processed on a resourceful server computer, enables processing of a document file in a file format (e.g., a Microsoft Office file) that is difficult to develop on a mobile terminal.

Further, in recent years, mobile terminals have been introduced to various type of work, and there have been increasing demands for high-quality printing from mobile terminals. To realize the high-quality printing, it is necessary to generate a print job based on vector format PDL data supported by the printing apparatus and transmit the generated print job to the printing apparatus. In general, vector format data is configured by a resolution-independent graphic command, and thus a printing apparatus having received a print job based on vector format PDL data can render the print job with the highest print resolution that can be realized by the printing apparatus. Accordingly, the highest possible print image quality that can be realized by the printing apparatus can be produced depending on settings.

The PDL, which is an abbreviation of "page description language," is data describing an output image in a specific page size (specific sheet size), and the PDL always defines the page size. Further, in the case of vector format PDL data, various types of objects (e.g., graphics and text which include color information) are placed on specified coordinates on a page. Thus, in order to develop a document file to generate vector format PDL data on a server computer, it is necessary to provide the server computer with print setting information such as the size of a sheet used for printing and color/monochrome setting.

However, in a user operation performed on the print application in the present specification, final confirmation of print settings (e.g., sheet size, color/monochrome, number of copies, sheet feeding tray, etc.) is made at the timing of pressing a print execution button on the print application. Thus, if the print application is configured not to issue a PDL data generation command to the server computer until the print execution button is pressed, it takes time for the printing apparatus to start operation in response to the print execution button being pressed by the user.

FIG. 1 illustrates a configuration of a data processing system according to a first exemplary embodiment. This example is a system in which a server computer, a mobile data processing apparatus, and a printing apparatus can communicate with one another via a network.

In FIG. 1, a mobile data processing apparatus 101 is a computer used by a user to issue an instruction for transmitting a print job to a printing apparatus 104. The printing apparatus 104 includes a printer function, a copy function, a scanner function, and a fax transmission function. The printing apparatus 104 further includes a function of receiving a print job generated based on vector format PDL data and render the received print job.

The data processing apparatus 101 and the printing apparatus 104 are connected to a local area network (LAN) 103 and communicate with each other to transmit and receive information via the LAN 103. A wireless LAN terminal 102 is a base unit of a wireless LAN having a general network router function and provides a wireless LAN within a house, office, etc. Further, the data processing apparatus 101 has a wireless LAN connection function and can participate in the LAN 103 via the wireless LAN terminal 102. When the data processing apparatus 101 enters the wireless LAN area provided by the wireless LAN terminal 102, the data processing apparatus 101 can automatically participate in the LAN 103 by using preset authentication information.

A server computer 105 exists on the Internet. The LAN 103 is connected to the Internet, and an apparatus participating in the LAN 103 can access the server computer 105.

Figure 2:
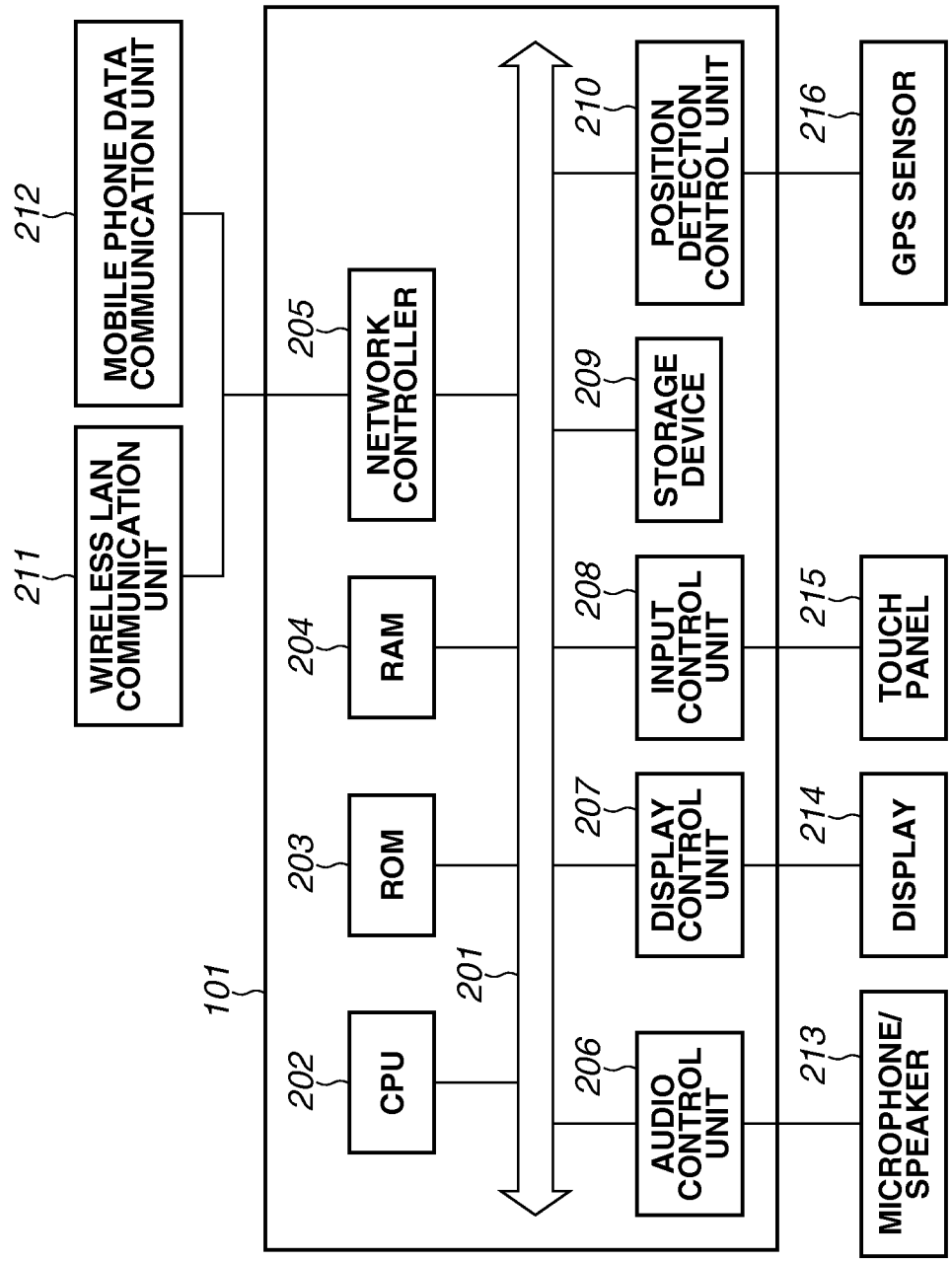
FIG. 2 illustrates a hardware configuration of a data processing apparatus.

FIG. 2 is a block diagram illustrating a hardware configuration of the data processing apparatus 101 illustrated in FIG. 1.

The data processing apparatus 101 is a mobile terminal or a smartphone. Thus, an operating system for small-size terminals and a program for controlling phone calls and data communication may be running on the data processing apparatus 101. Alternatively, the data processing apparatus 101 may be a personal computer that does not include an audio control unit 206, a microphone/speaker 213, a position detection control unit 210, a Global Positioning System (GPS) sensor 216, a mobile phone data communication unit 212, etc., all of which will be described below.

Each hardware component is connected to a system bus 201. A read-only memory (ROM) 203 stores software to be read when the data processing apparatus 101 is activated.

A random access memory (RAM) 204 is a work memory area for execution of a program. The RAM 204 is a work memory area for the print application to generate a print job and also a memory for temporarily storing, for example, authentication information for access to web page data and a web service acquired from a web server by a web browser. A storage device 209 is a non-volatile storage device and stores an operating system for the data processing apparatus 101 and applications for controlling phone calls and data communication, which are executed by a central processing unit (CPU) 202. Examples of an application for controlling data communication include a print application, mail software, and a web browser. The storage device 209 also stores various types of operation mode settings that need to be retained even after the data processing apparatus 101 is restarted, operation logs, etc.

Further, the CPU 202 executes processing based on a program stored in the storage device 209 to realize a software configuration of the data processing apparatus 101 illustrated in FIG. 5 and each step of flowcharts to be described below.

A network controller 205 performs communication control on a wireless LAN communication unit 211 for participating in a network of the LAN 103 via the wireless LAN terminal 102, and on the mobile phone data communication unit 212 for participating in a network provided by a mobile carrier. In general, when it is possible to participate in the wireless LAN, the network controller 205 prioritizes connection to the wireless LAN. When the data processing apparatus 101 moves outside the network area of the wireless LAN, the network controller 205 participates in a wireless communication network provided by a mobile carrier.

The audio control unit 206 is used mainly when a phone call application is launched and the user talks on the phone. Audio data is input/output via the microphone/speaker 213, and the audio control unit 206 intermediates between the microphone/speaker 213 and a control program for the microphone/speaker 213.

A display control unit 207 controls information to be output on a display 214 of the data processing apparatus 101. An input control unit 208 controls information of an instruction input by a user with a button or a touch panel 215 of the data processing apparatus 101. Using the audio control unit 206, the display control unit 207, and the input control unit 208, an application on the data processing apparatus 101 provides network communication information and various types of information about the data processing apparatus 101 to the user. The position detection control unit 210 acquires position information of the data processing apparatus 101 from the GPS sensor 216 and provides the acquired position information to the operating system. The foregoing control is performed by the operating system running on the CPU 202.

Figure 3:
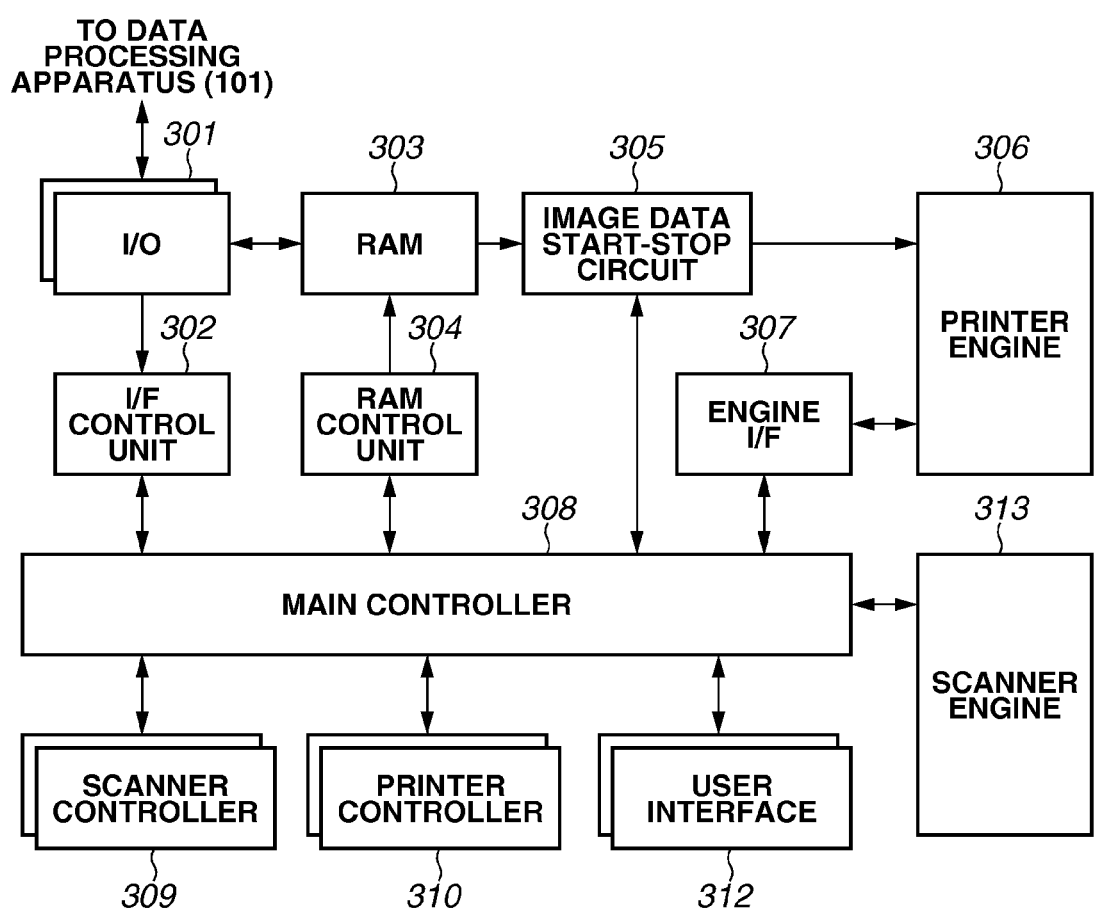
FIG. 3 illustrates a hardware configuration of a printing apparatus.

FIG. 3 is a block diagram illustrating a hardware configuration of the printing apparatus 104 illustrated in FIG. 1. This example illustrates a multifunction peripheral (MFP) having a scanner function and a printer function.

In FIG. 3, an input/output (I/O) 301 is connected to the data processing apparatus 101 via a communication medium such as the network (LAN) 103. A plurality of I/Os 301 may be included to support a plurality of connection forms. The printing apparatus 104 transmits a device identifier (ID) and a scan image to the data processing apparatus 101 via the I/O 301. Further, the printing apparatus 104 receives various types of control commands from the data processing apparatus 101 to perform processing. An interface (I/F) control unit 302 controls various types of interfaces. A RAM 303 is a primary storage device used to store external data such as a control command acquired via the I/O 301 and an image read by a scanner engine 313. Further, the RAM 303 is also used to store an image that has been developed by a printer controller 310 and is to be transmitted to a printer engine 306.

Allocation management of the RAM 303 is performed by a RAM control unit 304. An image data start-stop circuit 305 is a device configured to output, in synchronization with the rotation of the printer engine 306, an image that is acquired by the printer controller 310 or the scanner engine 313 and then developed in the RAM 303.

The printer engine 306 is a device configured to develop an image on an output medium such as a sheet. A main controller 308 performs various types of control on the printer engine 306 via an engine I/F 307.

Further, the main controller 308 is a main control module and performs processing for appropriately allocating control languages received from the data processing apparatus 101 via the I/O 301 to a scanner controller 309 and the printer controller 310. Further, the main controller 308 is supported by the scanner controller 309, the printer controller 310, and a user interface 312 to control the printer engine 306 and the scanner engine 313.

The scanner controller 309 decomposes a scan control command received from the data processing apparatus 101 into internal execution commands interpretable by the main controller 308. Further, the scanner controller 309 changes an image read by the scanner engine 313 to a scan control command.

The printer controller 310 decomposes a print job received from the data processing apparatus 101 into internal execution commands interpretable by the main controller 308 and including a developed image. The developed image is transmitted to the printer engine 306 and printed on an output medium such as a sheet.

Figure 4:
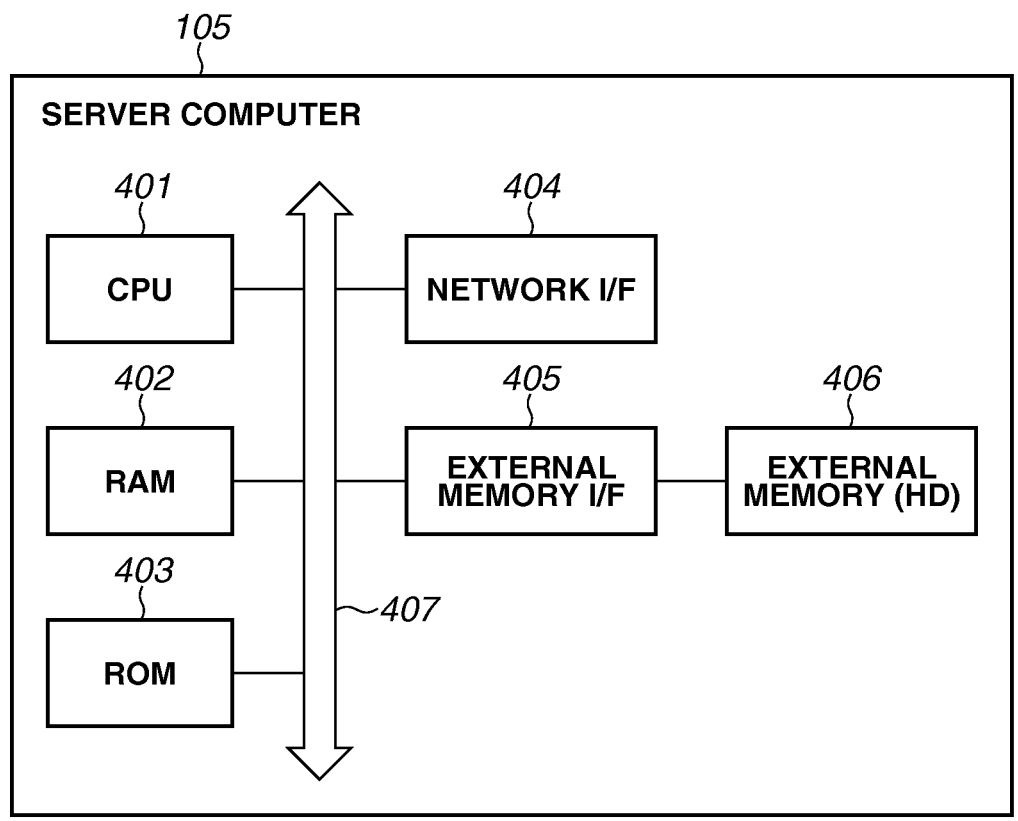
FIG. 4 illustrates a hardware configuration of a server computer.

FIG. 4 is a block diagram illustrating a hardware configuration of the server computer 105 illustrated in FIG. 1. In the server computer 105, a CPU 401 executes processing based on, for example, an application program stored in a ROM 403 or an external memory 406. Further, the CPU 401 comprehensively controls devices connected to a system bus 407. A RAM 402 functions as a main memory and a work area for the CPU 401. The ROM 403 is a read-only memory that functions as a storage area of a basic I/O program, etc. The ROM 403 or the external memory 406 stores an operating system program (hereinafter referred to as an "OS"), which is a control program for the CPU 401. Further, the external memory 406 stores files and various types of data to be used in the processing based on the above-described application program, etc. A network I/F 404 connects to a network to perform network communication. An external memory I/F 405 controls access to the external memory 406 such as a hard disk (HD). The external memory 406 stores a boot program, various types of applications, user files, edit files, etc.

The server computer 105 operates in a state where the CPU 401 executes the basic I/O program and the OS written to the ROM 403 and the external memory 406. The basic I/O program is written to the ROM 403, and the OS is written to the external memory 406. When the server computer 105 is powered on, the OS is loaded from the external memory 406 into the RAM 402 by an initial program loading function in the basic I/O program so that the operation of the OS is started. A system bus 407 connects the devices with one another.

Figure 5:
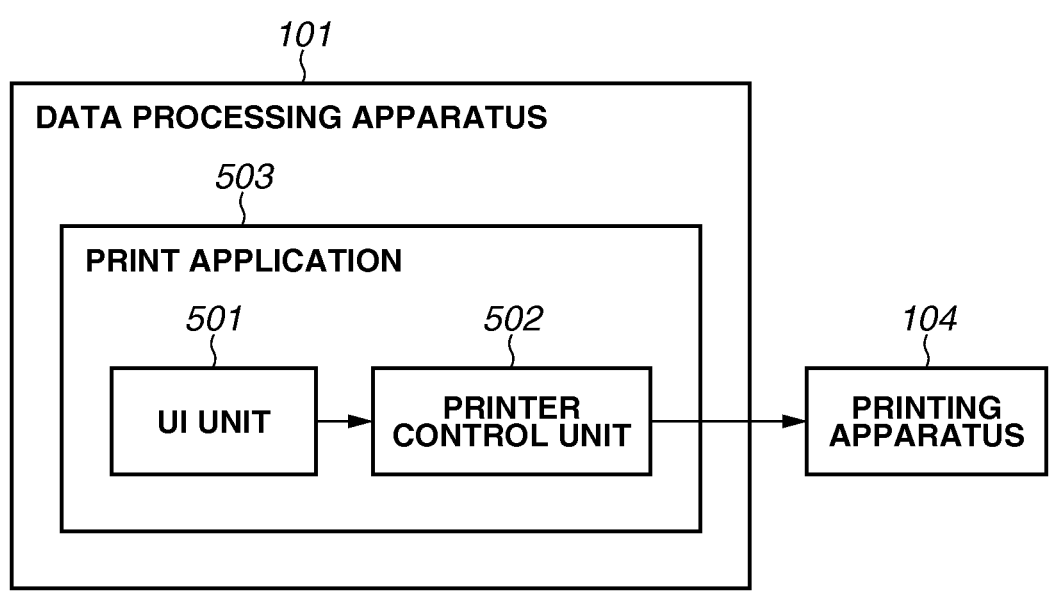
FIG. 5 is a block diagram illustrating a software configuration of a data processing apparatus.

FIG. 5 is a block diagram illustrating a software configuration of the data processing apparatus 101 illustrated in FIG. 1. A print application 503 includes a UI unit 501 and a printer control unit 502. The printer control unit 502 has a function of generating a print job including PDL data and print setting information and transmitting the generated print job to the printing apparatus 104 with which communication can be performed. The UI unit 501 provides various types of user interfaces for executing the foregoing functions, receives requests from a user via the provided user interfaces, and manages execution of each function processing.

Figure 6:
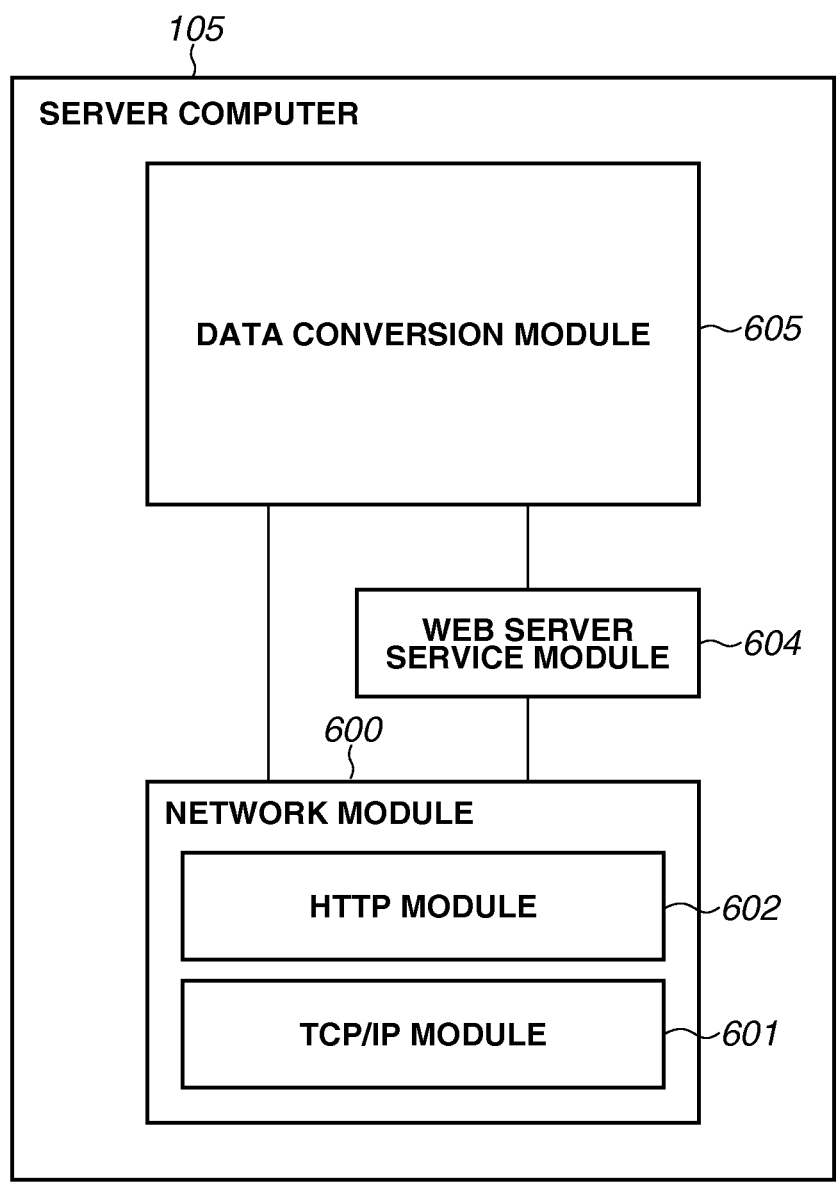
FIG. 6 is a block diagram illustrating a software configuration of a server computer.

FIG. 6 is a block diagram illustrating a software configuration of the server computer 105 illustrated in FIG. 1. In the server computer 105, each module exists as a file stored in the external memory 406. Each module is a program module to be loaded into the RAM 402 at the time of execution and executed by the OS or a module that is to use the loaded module. Further, a data conversion module 605 can be added to a HD of the external memory 406 via a compact disk read-only memory (CD-ROM) (not illustrated) or a network.

A network module 600 performs network communication with various types of computers. The network module 600 includes a Transmission Control Protocol/Internet Protocol (TCP/IP) module 601 and a Hypertext Transfer Protocol (HTTP) module 602. The TCP/IP module 601 performs network communication using TCP/IP. The HTTP module 602 uses TCP as the transport protocol and performs network communication using HTTP. A web server service module 604 provides a service that sends back an HTTP response to the data processing apparatus 101 when receiving an HTTP request therefrom. The data conversion module 605 converts a document file received from the data processing apparatus 101 via network communication to generate various types of print data (e.g., vector format PDL data, JPEG image) according to a conversion command received from the data processing apparatus 101, and places the generated print data in a location from which the data processing apparatus 101 can acquire the generated print data.

Figure 7:
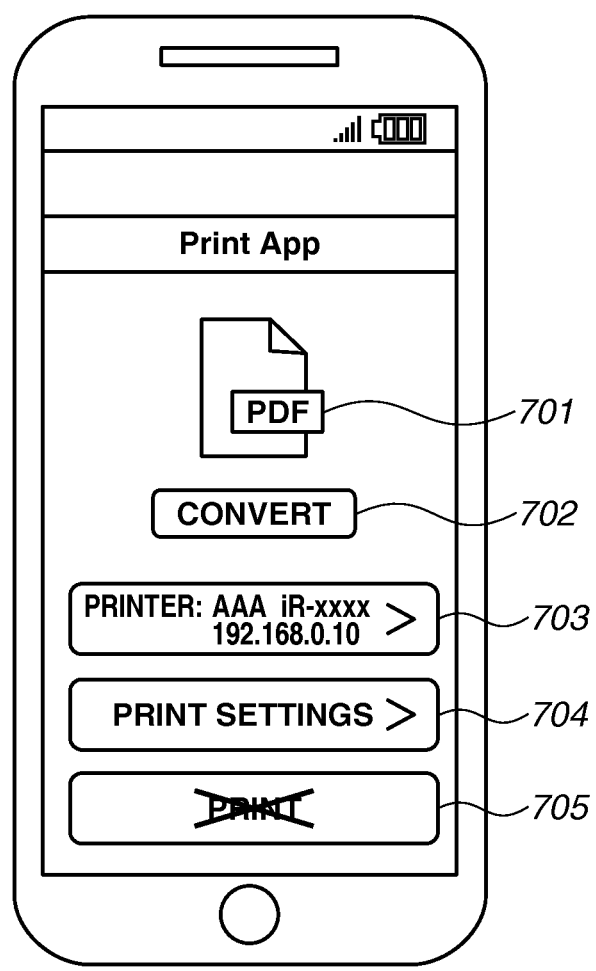
FIG. 7 illustrates an example of a user interface (UI) of a print application that is displayed before a preview is displayed.

FIG. 7 illustrates a user interface of the data processing apparatus 101, in which processing is performed in response to receiving various types of operations input by the user. An area 701 displays a document file acquired by the data processing apparatus 101. Here, only an icon is displayed as illustrated in the area 701 because the data processing apparatus 101 cannot preview the document due to the lack of a function of developing an acquired document file. A button 702 is a trigger button to communicate with the server computer to start processing to convert a document file into various types of data files, and receive a preview execution instruction. A button 703 is used to display a printer model and an IP address of a printing apparatus selected as a target printing apparatus. The button 703 is also used to move to a selection screen for selecting a printing apparatus as a target printing apparatus. A button 704 is used to move to a screen for performing print settings. At the press of the button 704, the screen is changed to a print setting screen illustrated in FIG. 9 (described below) and the print setting screen functions as a reception unit configured to receive changes to various types of print settings. A button 705 is used to receive a print execution instruction, serving as a trigger to start print processing. In the example illustrated in FIG. 7, since the document file has not been developed, the print execution button 705, which serves as a trigger to start print processing, is in a disabled state (state in which reception of a print execution instruction is disabled).

Figure 8:
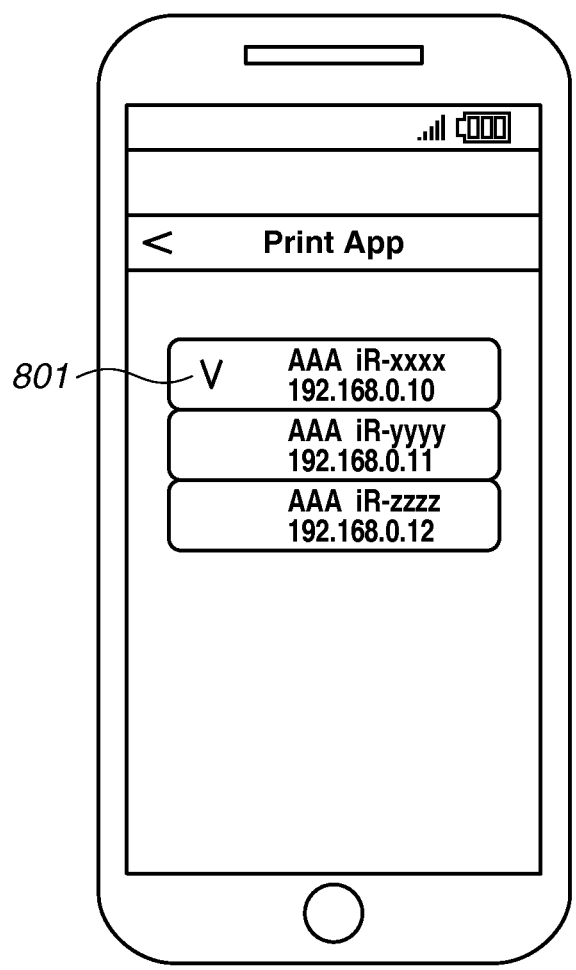
FIG. 8 illustrates an example of a UI of a print application for selecting a printing apparatus as a target printing apparatus.

At the press of the button 703 described above, the screen is changed to a printing apparatus selection screen illustrated in FIG. 8, and a printing apparatus can be selected as a target printing apparatus as illustrated in an area 801. The printing apparatuses listed on the selection screen are displayed by the following process. First, the data processing apparatus 101 searches for network devices managed by the Simple Network Management Protocol (SNMP) on the LAN 103 in which the data processing apparatus 101 is participating. Then, among the network devices found in the search, the data processing apparatus 101 identifies and displays printing apparatuses with which the data processing apparatus 101 can print. It is assumed in the example illustrated in FIG. 8 that a plurality of printing apparatuses that is not illustrated in FIG. 1 and is similar to the printing apparatus 104 participates in the LAN 103.

The following describes operations in print job generation processing to be started when the button 702 is pressed to issue a conversion (preview generation) instruction.

Figure 10:
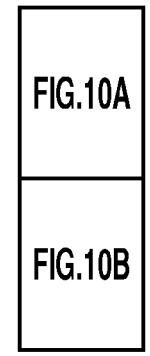
FIG. 10, which includes 10A and 10B, is a flowchart illustrating a processing flow to be performed by a data processing apparatus.
Figure 10A:
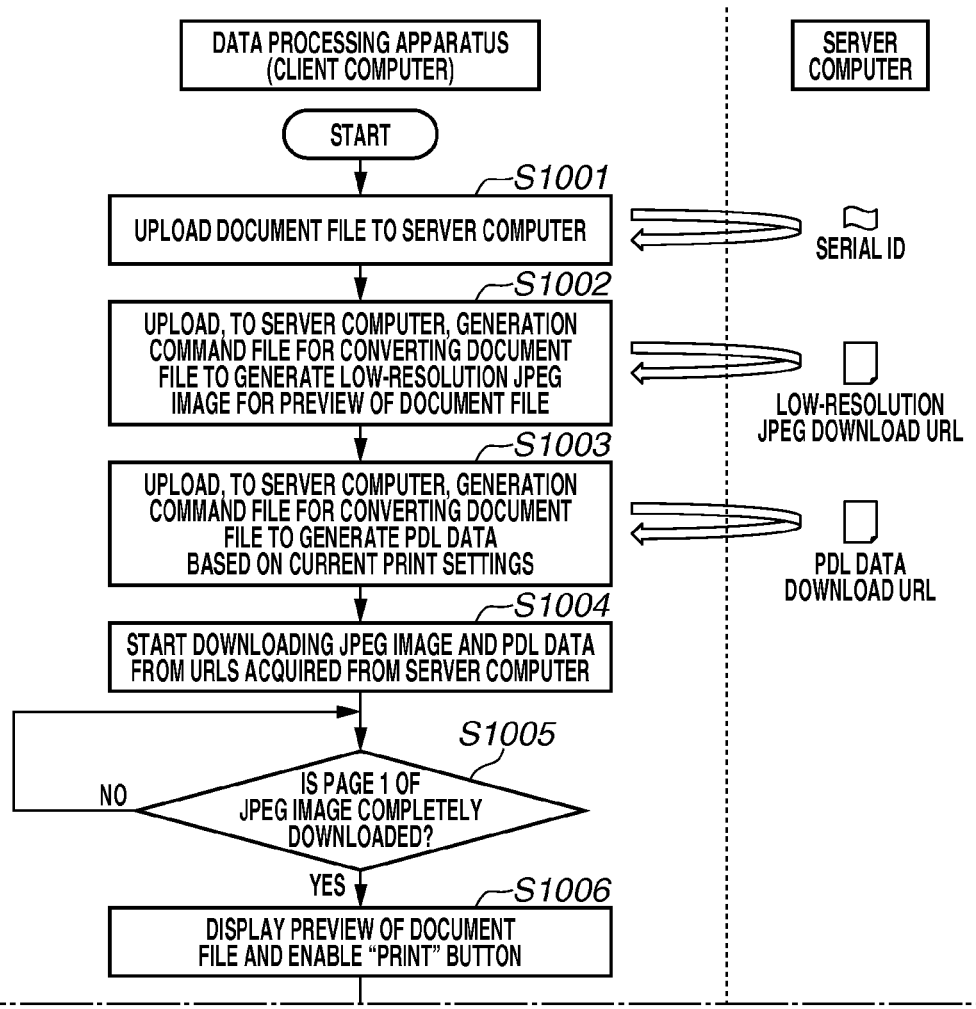
Figure 10B:
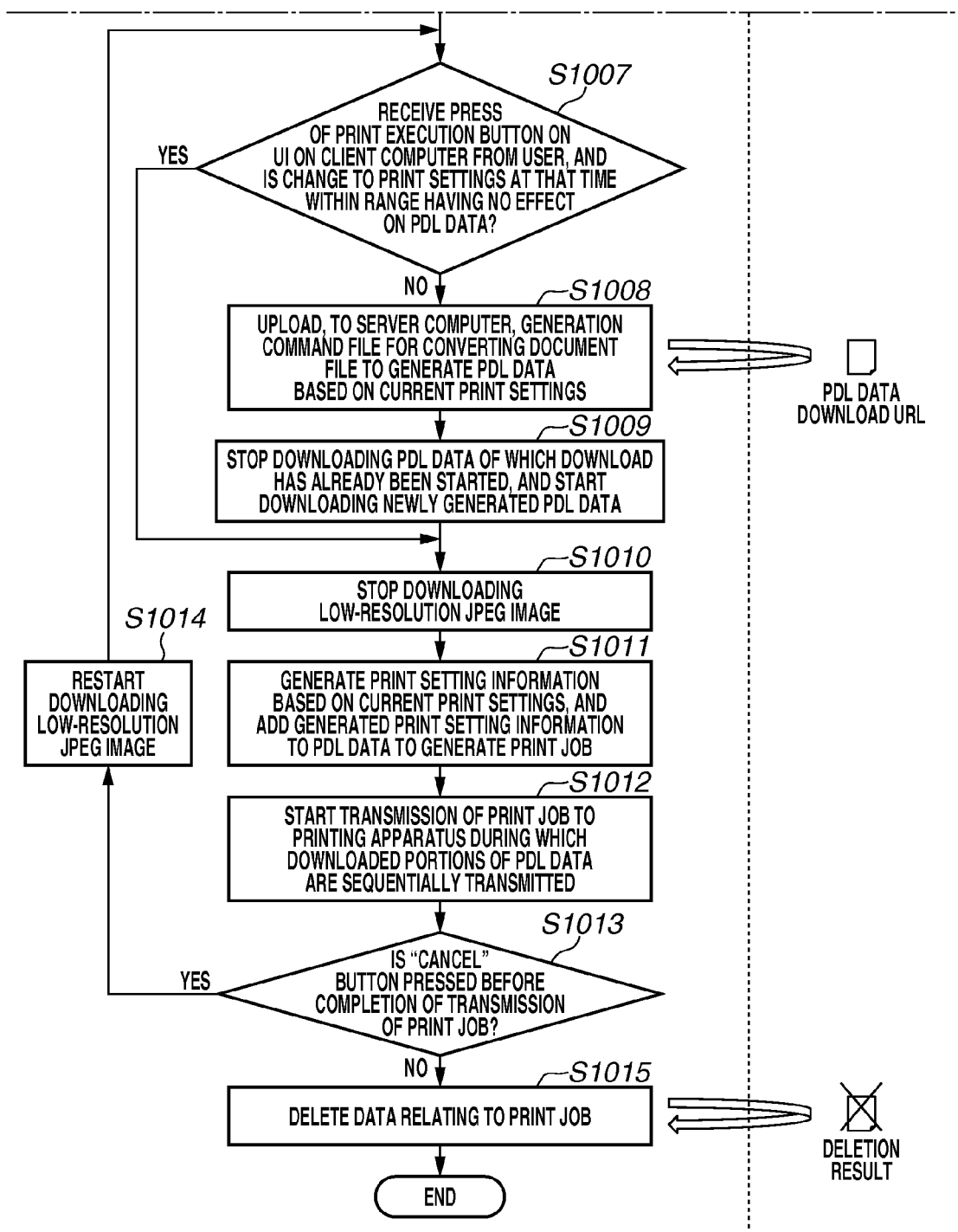

FIG. 10 is a flowchart illustrating the print job generation processing performed by the data processing apparatus 101 and also illustrates communication processing with the server computer 105.

In step S1001, the data processing apparatus 101 serving as a client computer uploads a document file to the server computer 105. At this time, the server computer 105 issues a serial ID for identification so that the document file uploaded to the server computer 105 by the data processing apparatus 101 can be specified at the time of the data processing apparatus 101 executing a conversion command at a later time. Then, the data processing apparatus 101 receives an HTTP response including the serial ID from the server computer 105.

In step S1002, the data processing apparatus 101 uploads, to the server computer 105, a generation command file for converting the document file to generate a low-resolution JPEG image for a preview of the document file. While the present specification describes a JPEG image as an example of an image for a preview, any other format such as Portable Network Graphics (PNG) or Graphics Interchange Format (GIF) may be employed.

The generation command file is a file in Extensible Markup Language (XML) format describing a conversion format and the serial ID acquired in step S1001. A JPEG image or PDL data is specified as the conversion format of the generation command file. In the case of the JPEG image, a resolution is additionally specified. In the case of the PDL data, print settings such as the sheet size and color/monochrome are additionally specified.

In step S1002, the data processing apparatus 101 transmits to the server computer 105 the generation command file that specifies the JPEG image as the conversion format of the document file and also specifies a low resolution as the resolution. Then, the server computer 105 converts the document file received in step S1001 according to the foregoing generation command file to generate a low-resolution JPEG image and then places the generated JPEG image in a location from which the data processing apparatus 101 can receive the JPEG image. Further, the data processing apparatus 101 receives from the server computer 105 an HTTP response including a universal resource locator (URL) indicating the location of the generated JPEG image.

In step S1003, the data processing apparatus 101 uploads, to the server computer 105, a generation command file in which the PDL data is specified as the conversion format of the document file. More specifically, the data processing apparatus 101 uploads, to the server computer 105, the generation command file for converting the document file to generate PDL data based on the print settings that have been set using the user interface illustrated in FIG. 9 at the time of the button 702 being pressed. Then, as in step S1002, the server computer 105 having received the generation command file converts the document file received in step S1001 according to the generation command file to generate PDL data and then places the generated PDL data in a location from which the data processing apparatus 101 can receive the PDL data. Further, the data processing apparatus 101 receives from the server computer 105 an HTTP response including a URL indicating the location of the generated PDL data.

In step S1004, the data processing apparatus 101 starts downloading the low-resolution JPEG image and the PDL data from the URLs acquired in steps S1002 and S1003, respectively. The data processing apparatus 101 can have a plurality of communication connections for the download. For example, in the case of having two communication connections, by using one of the communication connections for the download of the low-resolution JPEG image and the other for the download of the PDL data, two communication connections are used in total.

In step S1005, the data processing apparatus 101 determines whether page 1 of the low-resolution JPEG image is completely downloaded. If page 1 of the low-resolution JPEG image is completely downloaded (YES in step S1005), the processing proceeds to step S1006. On the other hand, if page 1 of the low-resolution JPEG image is not completely downloaded (NO in step S1005), the data processing apparatus 101 waits for the completion of the download of page 1 of the low-resolution JPEG image.

Figure 11:
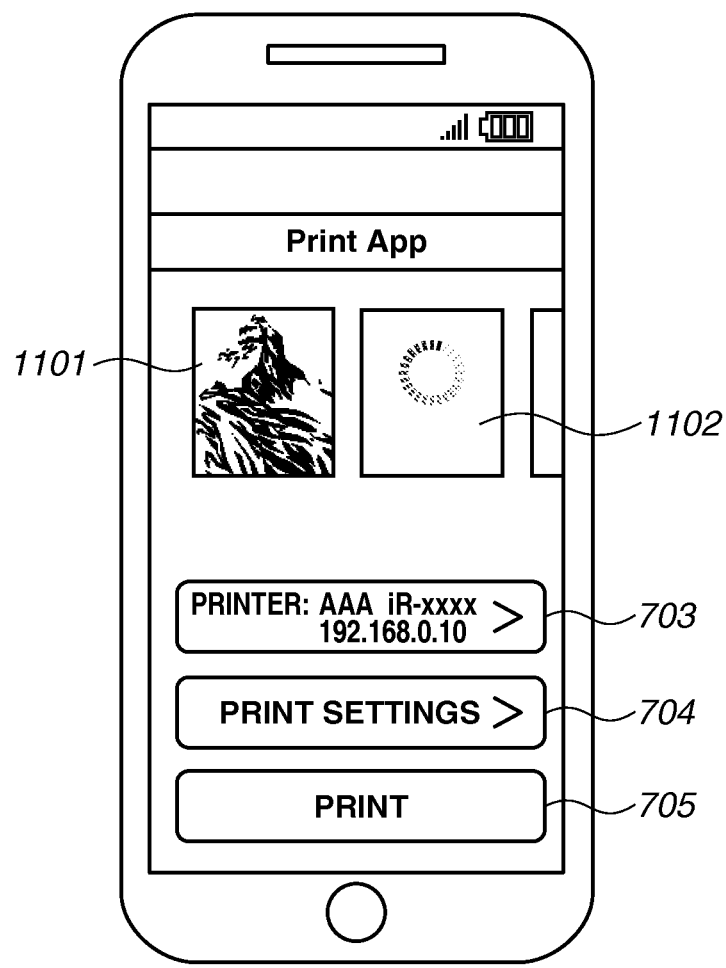
FIG. 11 illustrates an example of a UI of a print application that is displayed during display of a preview.

In step S1006, a screen illustrated in FIG. 11 is displayed as a user interface of the data processing apparatus 101 serving as a client computer. On the screen illustrated in FIG. 11, a preview 1101 of the document file based on the downloaded low-resolution JPEG image is displayed, and the print execution button 705 is displayed in an enabled state (state in which reception of a print execution instruction is enabled). Thus, a trigger for starting print processing can be received. In a case where the document file includes a plurality of pages, the low-resolution JPEG image for a preview includes a plurality of pages. In this case, there may be a case where, for example, page 2 and the subsequent pages, which have not been completely downloaded, cannot be previewed. In this case, as illustrated in an area 1102, a display indicating that the page is being downloaded is performed.

During a period after the button 702 illustrated in FIG. 7 is pressed and before the print execution button 705 is pressed in step S1007 (described next), the user can freely change the print settings by using the user interface illustrated in FIG. 9. This may lead to a difference between the print settings at the timing of the preview and the print settings at the timing of the printing execution.

In step S1007, in response to the user pressing the print execution button 705 displayed in the enabled state in step S1006, the print settings at the timing of the press of the print execution button 705 are compared to the print settings used in step S1003 (print settings confirmed at the time of the press of the button 702). Then, whether a change made to the print settings by the user is within a range having no effect on the PDL data is determined based on the comparison.

Figure 9:
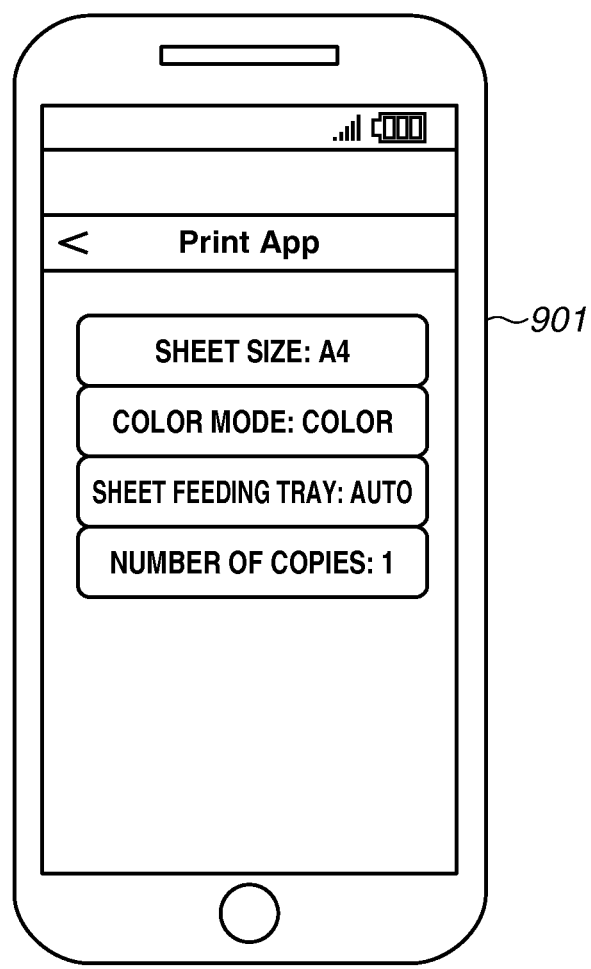
FIG. 9 illustrates an example of a UI of a print application for performing print settings.

For example, in a case where the print settings that are settable by the print application 503 of the data processing apparatus 101 are "sheet size," "color mode," "sheet feeding tray," and "number of copies" as illustrated in FIG. 9, the print setting items that have an effect on the PDL data in the present specification are "sheet size" and "color mode." More specifically, in step S1007, if the print setting "sheet size" or "color mode" is changed during the period between the press of the button 702 and step S1007, it is determined that print data based on the new print settings needs to be downloaded from the server. In the present specification, a specific example is that if the sheet size is changed from A3 to A4 or the color mode is changed from color to monochrome, it is determined that print data based on A4 or monochrome needs to be downloaded.

The present specification describes that it is determined that print data based on changed print settings needs to be downloaded in the case of the foregoing specific example. However, by using the following configuration, even in the case of the same specific example, it may be determined that print data based on changed print settings does not need to be downloaded. For example, with respect to the color mode, the configuration is provided with a function of changing color print data to monochrome print data within the data processing apparatus 101. This configuration allows, even when the color mode is changed from color to monochrome, the print data to be changed within the data processing apparatus 101, and therefore it can be determined that print data based on the changed print settings does not need to be downloaded.

Figure 12:
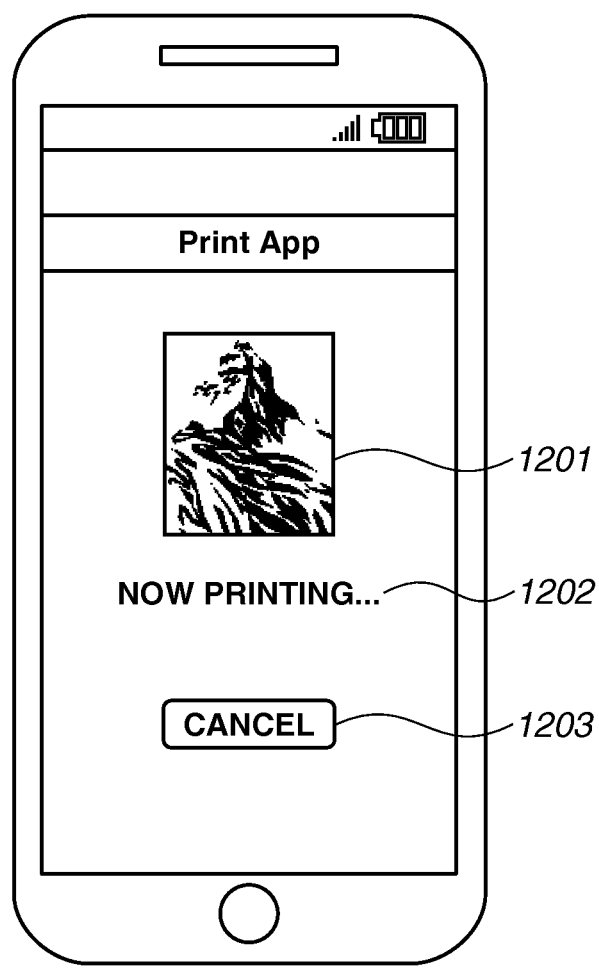
FIG. 12 illustrates an example of a UI of a print application that is displayed during printing.

In step S1007, if no change is made to the print settings by the user or if a change made to the print settings is within a range having no effect on the PDL data (YES in step S1007), the processing proceeds to step S1010. In this case, even if the print settings have been changed, PDL data based on the changed print settings does not need to be downloaded from the server computer 105. On the other hand, if a change made to the print settings by the user is not within a range having no effect on the PDL data (NO in step S1007), the data processing apparatus 101 needs to download the PDL data based on the new print settings, and the processing proceeds to step S1008. At the timing of step S1007, the user interface is changed to a user interface indicating that the print processing is ongoing as illustrated in FIG. 12. In FIG. 12, a preview 1201 is a preview of page 1 of the document file, and a message 1202 indicates that the printing is ongoing. A cancel button 1203 is used to cancel the print processing and bring back the user interface to the previous state illustrated in FIG. 11.

In step S1008, since PDL data based on the new print settings needs to be downloaded, a generation command file in which the PDL data is specified as the conversion format of the document file is uploaded again to the server computer 105. More specifically, the data processing apparatus 101 uploads, to the server computer 105, a generation command file for converting the document file to generate PDL data by using the print settings that have been set using the user interface illustrated in FIG. 9 at the time of the press of the print execution button 705. Then, as in step S1002 and S1003, the server computer 105 having received the generation command file converts the document file received in step S1001 according to the generation command file to generate PDL data and then places the generated PDL data in a location from which the data processing apparatus 101 can receive the PDL data. Further, the data processing apparatus 101 receives from the server computer 105 an HTTP response including a URL indicating the location of the generated PDL data.

In step S1009, the data processing apparatus 101 stops the download of the PDL data started in step S1004 and starts download of the PDL data that is newly generated in step S1008. It is obvious that the processing for stopping the download in step S1009 is not to be performed if the download of the PDL data started in step S1004 has already been completed at the timing of step S1009.

In step S1010, the data processing apparatus 101 stops the download of the low-resolution JPEG image for a preview started in step S1004. The print execution processing is started by the user at the time of step S1007, and page 2 and the subsequent pages of the document file do not need to be previewed as indicated by the preview 1201 in FIG. 12. Thus, the download of the low-resolution JPEG image for a preview is stopped. The download of the low-resolution JPEG image is stopped also from the point of view of increasing the PDL data download speed. It is obvious that the processing for stopping the download in step S1010 is not to be performed if the download of the low-resolution JPEG image for a preview started in step S1004 has already been completed.

In step S1011, the data processing apparatus 101 generates print setting information (information about the sheet feeding tray and the number of copies) based on the print settings that have been set using the user interface illustrated in FIG. 9 at the time of the press of the print execution button 705. Further, the data processing apparatus 101 adds the generated print setting information to a header portion of the PDL data to generate a print job.

In step S1012, the data processing apparatus 101 starts transmitting the print job to the printing apparatus 104 selected on the button 703 illustrated in FIG. 11. As described above, the print job includes the print setting information and the PDL data. The print setting information can be transmitted to the printing apparatus 104 immediately after the start of step S1012 because the print setting information is generated within the data processing apparatus 101. On the other hand, the PDL data is downloaded from the server computer 105, and it takes time to complete the download. Thus, portions of the PDL data that have been downloaded are sequentially transmitted to the printing apparatus 104. The printing apparatus 104 having received such partial PDL data can start operation to prepare for printing, based on the assumption that the PDL data can be completely received afterward. Further, in a case where a plurality of pages of output images is described in the PDL data received by the printing apparatus 104, each time the printing apparatus 104 receives a PDL data portion corresponding to a page of the document file, the printing apparatus 104 can perform the print processing up to the discharge of a sheet on which the page is printed. More specifically, in step S1007, if a change made to the print settings by the user is within a range having no effect on the PDL data (YES in step S1007), the printing apparatus 104 can start operation immediately after the print execution button 705 is pressed by the user.

In step S1013, the data processing apparatus 101 determines whether an operation to execute the cancellation is performed by the user before completion of the transmission of the print job. Execution of the cancellation by the user is triggered by the press of the cancel button 1203 illustrated in FIG. 12. If the cancellation is executed by the user before completion of the transmission of the print job (YES in step S1013), the processing proceeds to step S1014. On the other hand, if the cancellation is not executed by the user (NO in step S1013), it is determined that the transmission of the print job is completed, and the processing proceeds to step S1015.

In step S1014, the data processing apparatus 101 restarts the download of the low-resolution JPEG image for a preview stopped in step S1010 to bring back the user interface to the state illustrated in FIG. 11, and the processing returns to step S1007. It is obvious that the processing for restarting the download in step S1014 is not to be performed if the download of the low-resolution JPEG image for a preview started in step S1004 has already been completed.

In step S1015, since the transmission of the print job from the data processing apparatus 101 to the printing apparatus 104 is completed, data relating to the print job is deleted. As to the data generated by the server computer 105 in steps S1002, S1003, and S1008, the data processing apparatus 101 specifies the serial ID acquired in step S1001 and commands the server computer 105 to delete the data. In this way, the server computer 105 deletes the generated data. Then, the data processing apparatus 101 acquires from the server computer 105 an HTTP response including a result of the deletion. Further, the data processing apparatus 101 deletes the data downloaded thereto in steps S1002, S1003, and S1008, and the processing is ended.

According to the foregoing processing, if the print settings specified by the user at the time of execution of printing are within the print settings having no effect on PDL data, PDL data that is being downloaded or has already been downloaded is directly used to generate a print job so that the time from the press of the print execution button by the user to the start of the operation of the printing apparatus can be reduced.

The following describes a second exemplary embodiment. There may be a case where the printing apparatus as the target printing apparatus of the data processing apparatus 101 covers not only a printing apparatus configured to process vector format PDL data but also an inexpensive model of a printing apparatus configured to process only raster data such as a JPEG image (hereinafter referred to as a "JPEG-based printing apparatus"). In such a case, depending on the printing apparatus serving as the target printing apparatus, the data processing apparatus 101 needs to change a data format to be specified at the time of uploading a document file to the server computer 105 to convert the file to generate data. As the second exemplary embodiment, a case will be described below, where a plurality of types of print data is handled in the first exemplary embodiment on the assumption that the printing apparatuses selectable by the data processing apparatus 101 include two types, the printing apparatus that supports PDL data and the JPEG-based printing apparatus.

Figure 13:
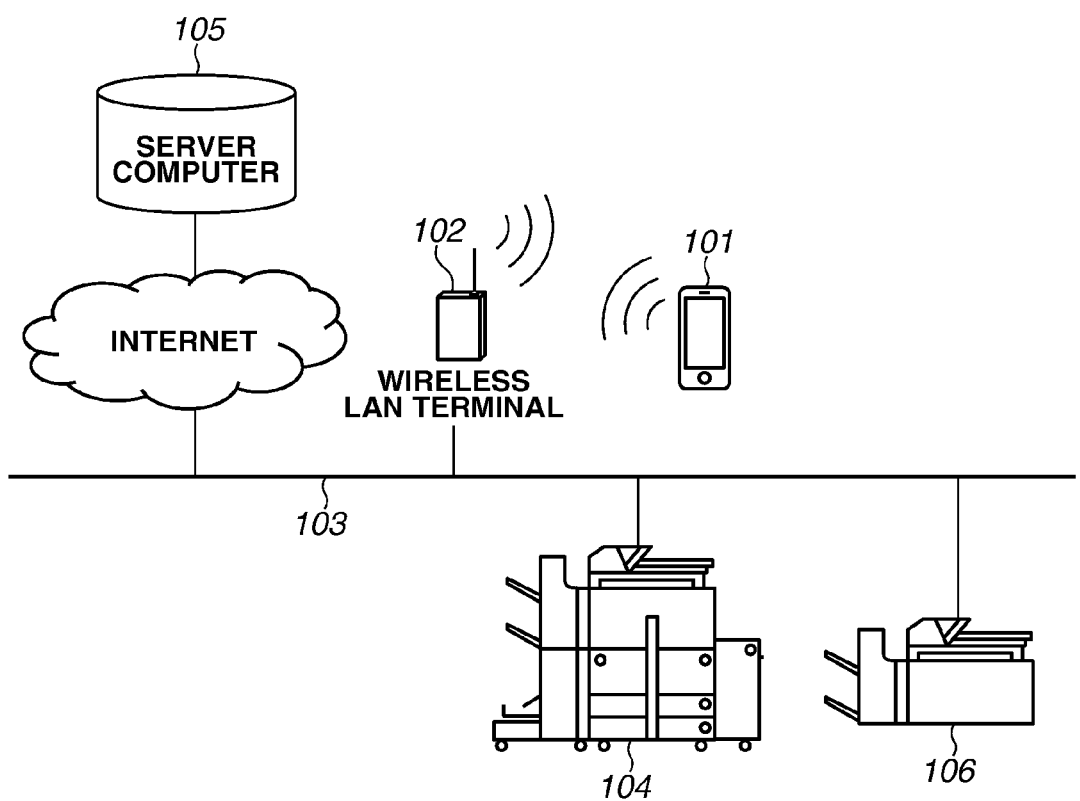
FIG. 13 illustrates a configuration of an entire system according to a second exemplary embodiment.
Figure 14B:
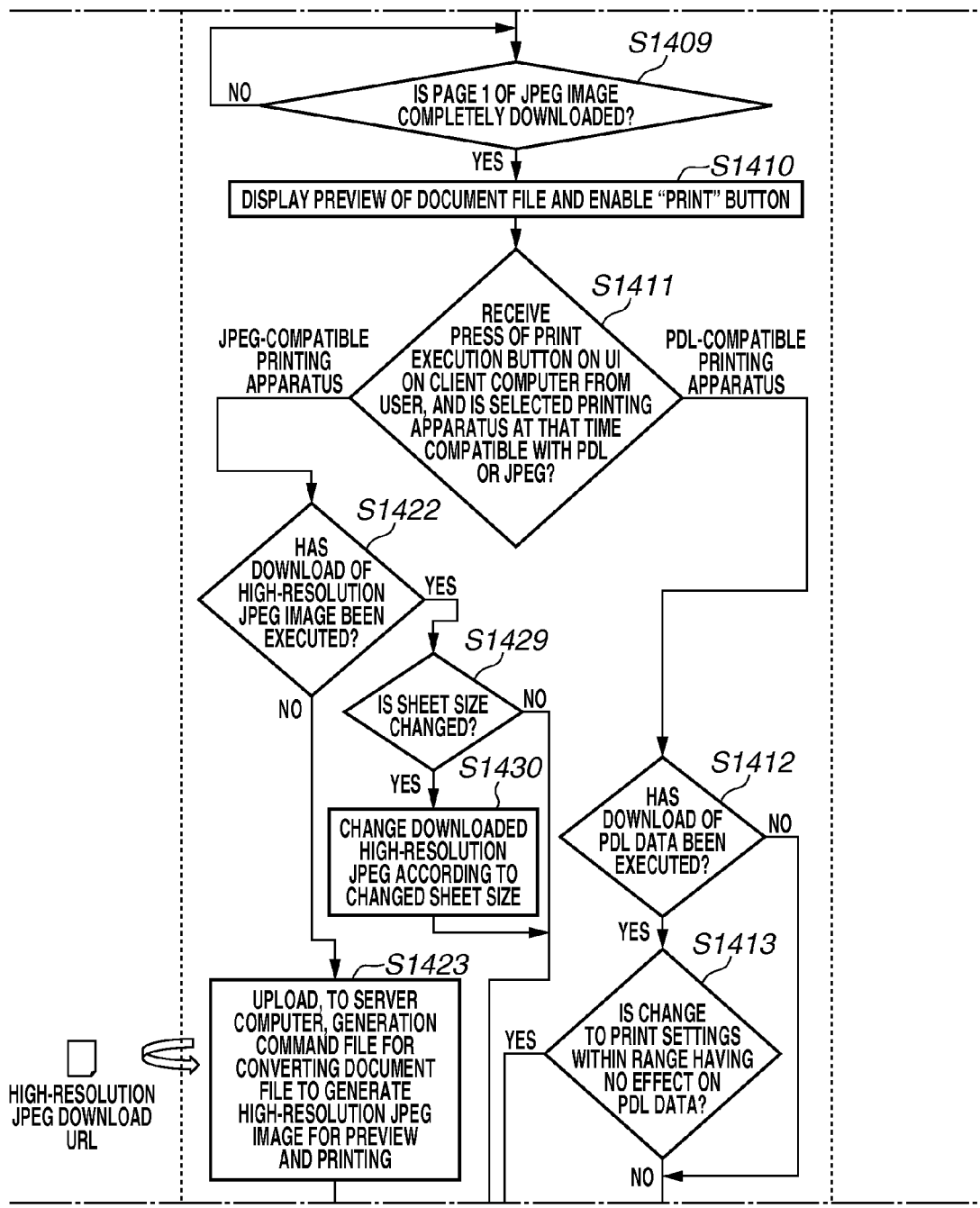
FIG. 14, which includes 14A, 14B, and 14C, is a flowchart illustrating a processing flow to be performed by a data processing apparatus according to the second exemplary embodiment.
Figure 14C:
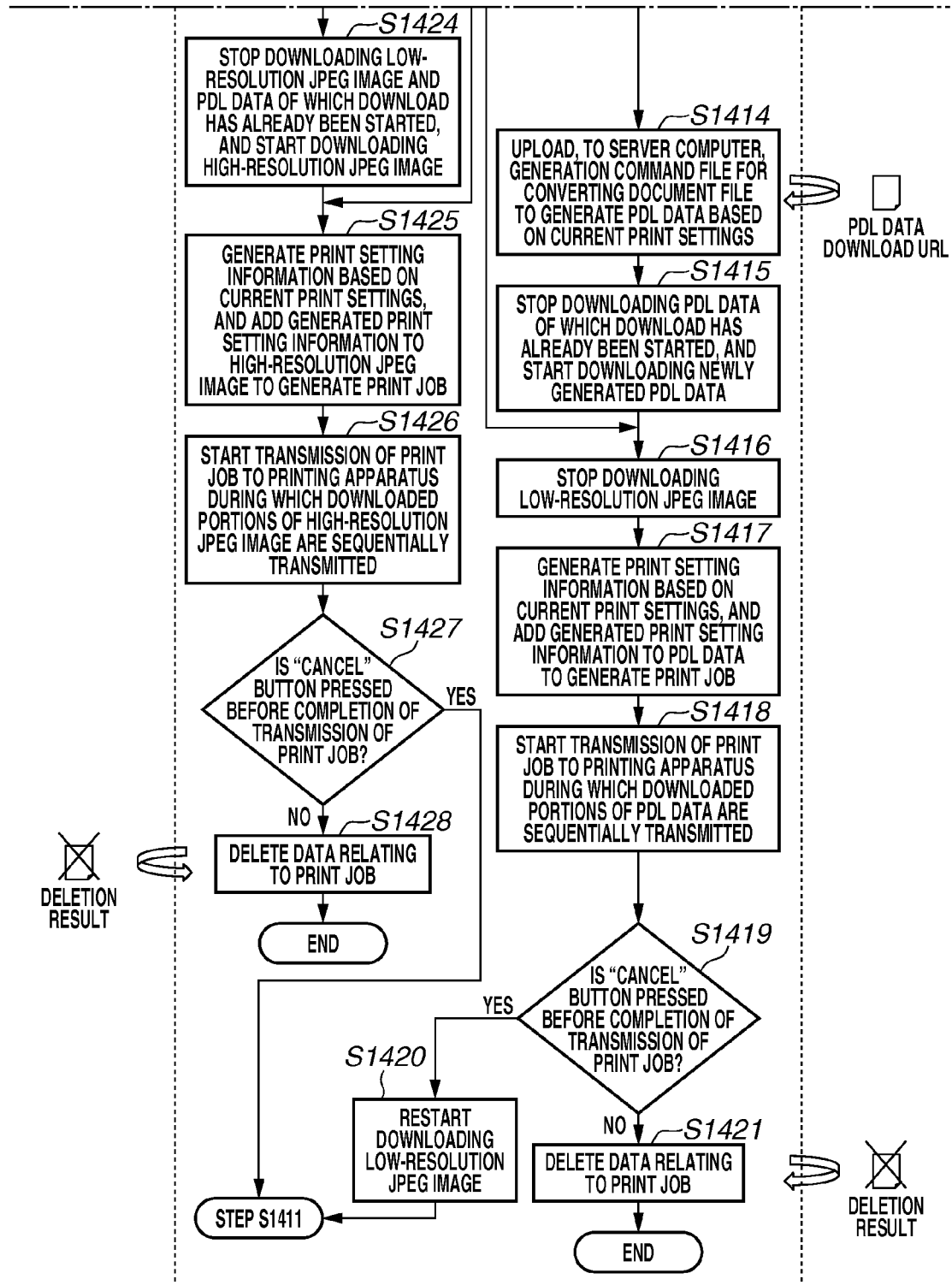

FIG. 13 illustrates a configuration of a data processing system according to the second exemplary embodiment, in which a JPEG-based printing apparatus 106 is added to FIG. 1 according to the first exemplary embodiment. As in the first exemplary embodiment, the second exemplary embodiment relates to print job generation processing that is started at the press of the button 702 illustrated in FIG. 7. The print job generation processing will be described in detail below with reference to a flowchart illustrated in FIG. 14.

In step S1401, the data processing apparatus 101 determines whether the type of the printing apparatus specified on the button 703 illustrated in FIG. 7 at the timing of the press of the button 702 is the printing apparatus 104 that supports PDL data or the JPEG-based printing apparatus 106.

The determination of the data format supported by the printing apparatus is performed based on management information base (MIB) information used by the data processing apparatus 101 performing a search for network devices managed by the SNMP on the LAN 103 in which the data processing apparatus 101 is participating. The MIB refers to information made public by a network device managed by the SNMP to inform an external device of the state of the network device. The MIB is defined by RFC 1213. The MIB "prtInterpreterDescription" is used to inquire about the data format supported by the printing apparatus.

In step S1401, if the type of the printing apparatus specified on the button 703 is the printing apparatus 104 that supports PDL data, the processing proceeds to step S1402. On the other hand, in S1401, if the type of the printing apparatus specified on the button 703 is the JPEG-based printing apparatus 106, the processing proceeds to step S1406.

Steps S1402, S1403, S1404, and S1405 are similar to steps S1001, S1002, S1003, and S1004 in the first exemplary embodiment. Further, step S1406 is similar to step S1001 in the first exemplary embodiment.

In step S1407, the data processing apparatus 101 uploads, to the server computer 105, a generation command file for converting the document file into a JPEG image, which is the format supported by the printing apparatus 106, to generate a high-resolution JPEG image. As in the first exemplary embodiment, the serial ID acquired in step S1406 is described in the generation command file. To ensure adequate print quality, a resolution of, for example, 300 or 600 dpi is specified as the resolution of the JPEG image specified in the generation command file in step S1407. The server computer 105 having received the generation command file converts the document file received in step S1406 according to the generation command file to generate a high-resolution JPEG image and then places the generated JPEG image in a location from which the data processing apparatus 101 can receive the generated JPEG image. Further, the data processing apparatus 101 receives from the server computer 105 an HTTP response including an URL indicating the location of the generated JPEG image.

In step S1408, the data processing apparatus 101 starts downloading the high-resolution JPEG image from the received URL. The high-resolution JPEG image downloaded in step S1408 is used both for printing and a preview.

In step S1409, the data processing apparatus 101 determines whether page 1 of the JPEG image (low-resolution JPEG image in a case where the processing proceeded to step S1409 via step S1403, or high-resolution JPEG image in a case where the processing proceeded to step S1409 via step S1407) is completely downloaded. If page 1 of the JPEG image is completely downloaded (YES in step S1409), the processing proceeds to step S1410. On the other hand, if page 1 of the JPEG image is not completely downloaded (NO in step S1409), the data processing apparatus 101 waits for the completion of the download of page 1 of the JPEG image.

Figure 15:
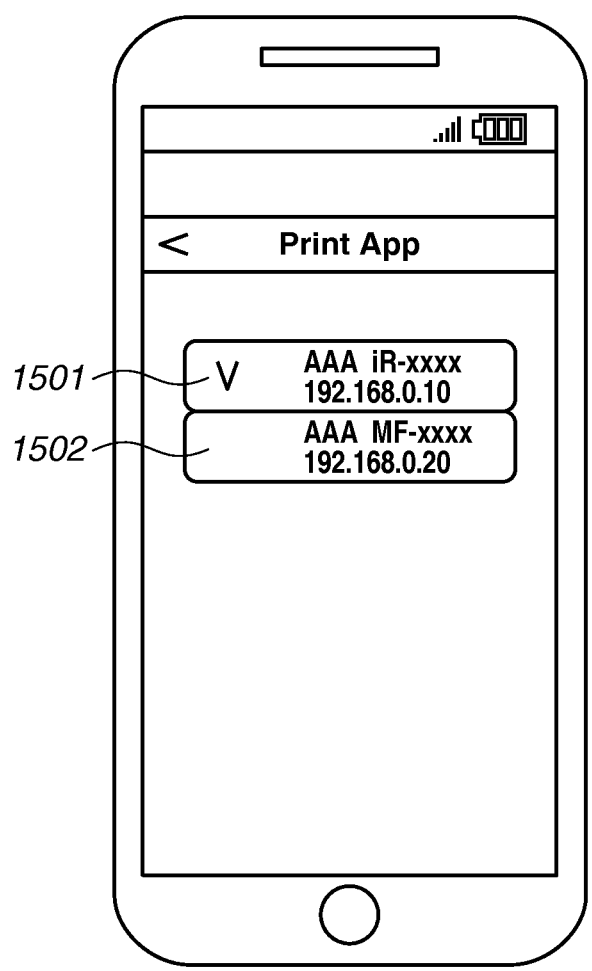
FIG. 15 illustrates an example of a UI for selecting a printing apparatus as a target printing apparatus according to the second exemplary embodiment.

In step S1410, the user interface of the data processing apparatus 101 serving as a client computer is changed to the preview 1101 of the document file as illustrated in FIG. 11, and the print execution button 705 is enabled so that a trigger for starting print processing can be received. Further, the screen can be moved to a printing apparatus selection screen illustrated in FIG. 15 at the press of the button 704 so that the user can select a printing apparatus as a target printing apparatus. FIG. 15 illustrates a printing apparatus search result in the configuration of the data processing system illustrated in FIG. 13. In FIG. 15, an area 1501 indicates the printing apparatus 104 supporting PDL data, and an area 1502 indicates the JPEG-based printing apparatus 106. The user can select a desired printing apparatus between them.

In step S1411, whether the printing apparatus that is displayed as an output destination on the button 703 in FIG. 11 at the time of the user operation of pressing the print execution button enabled in step S1410 is the printing apparatus 104 supporting PDL data or the JPEG-based printing apparatus 106 is determined. In step S1411, if the type of the printing apparatus specified on the button 703 is the printing apparatus 104 supporting PDL data, the processing proceeds to step S1412. On the other hand, if the type of the printing apparatus specified on the button 703 is the JPEG-based printing apparatus 106, the processing proceeds to step S1422.

In step S1412, the data processing apparatus 101 determines whether the download of the PDL data has been executed via step S1405 in the processing so far. If the download of the PDL data has been executed (YES in step S1412), the processing proceeds to step S1413. On the other hand, if the download of the PDL data has not been executed (NO in step S1412), the processing proceeds to step S1414.

Steps S1414, S1415, S1416, S1417, S1418, S1419, S1420, and S1421 are similar to steps S1008, S1009, S1010, S1011, S1012, S1013, S1014, and S1015 in the first exemplary embodiment. Following the execution of step S1420, the processing proceeds to step S1411.

In step S1422, the data processing apparatus 101 determines whether the download of the high-resolution JPEG image has been executed via step S1407 in the processing so far. If the download of the high-resolution JPEG image has been executed (YES in step S1422), the processing proceeds to step S1429. On the other hand, if the download of the high-resolution JPEG image has not been executed (NO in step S1422), the processing proceeds to step S1423.

As in the first exemplary embodiment, in the present exemplary embodiment, during the period after the press of the button 702 illustrated in FIG. 7 and before the press of the print execution button 705 in step S1411, the user can freely change the print settings by using the user interface illustrated in FIG. 9. This may lead to a difference between the print settings at the timing of the preview and the print settings at the timing of the printing execution, as described in step S1429 below.

In step S1429, the data processing apparatus 101 compares the print settings at the timing of the press of the print execution button 705 to the print settings used in step S1407 (print settings confirmed at the time of the press of the button 702) to determine whether the sheet size is changed. If the sheet size is changed (YES in step S1429), the processing proceeds to step S1430. On the other hand, if the sheet size is not changed (NO in step S1429), the processing proceeds to step S1425.

In step S1430, the sheet size of the downloaded high-resolution JPEG is changed to the sheet size selected at the timing of the press of the print execution button 705. A specific example is that if the original sheet size is A4 and the changed sheet size is A3, the sheet size is enlarged from A4 to A3.

Step S1423 is similar to step S1407. More specifically, the data processing apparatus 101 uploads, to the server computer 105, a generation command file for converting the document file into the JPEG format, which is the format supported by the printing apparatus 106, to generate a high-resolution JPEG image. Then, the data processing apparatus 101 receives from the server computer 105 an HTTP response including a URL indicating the location of the generated JPEG image.

In step S1424, the data processing apparatus 101 stops the download of the low-resolution JPEG image and the PDL data started in step S1405. Instead, the data processing apparatus 101 starts downloading the high-resolution JPEG image from the URL received in step S1423. The high-resolution JPEG image downloaded in step S1424 is used not only for printing but also for a preview at a later time in a case where the print processing is cancelled in step S1427 (YES in step S1427) to be described below.

In step S1425, the data processing apparatus 101 generates print setting information based on the print settings that have been set using the user interface illustrated in FIG. 9 at the time of the press of the print execution button 705. Further, the data processing apparatus 101 adds the generated print setting information to the high-resolution JPEG image to generate a print job.

In step S1426, the data processing apparatus 101 starts transmission of the print job to the printing apparatus 106 selected in the area 703 in FIG. 11. The print job to be transmitted in step S1426 includes the print setting information and the high-resolution JPEG image. The print setting information can be transmitted to the printing apparatus 106 immediately after the start of step S1426 because the print setting information is generated within the data processing apparatus 101. On the other hand, the high-resolution JPEG image is downloaded from the server computer 105, and it takes time to complete the download. Thus, portions of the data that have been downloaded are sequentially transmitted to the printing apparatus 106. The printing apparatus 106 having received such a partial high-resolution JPEG image can start operation to prepare for printing, based on the assumption that the high-resolution JPEG image can be completely received afterward. Further, in a case where the high-resolution JPEG image includes a plurality of pages because the document file includes a plurality of pages, each time the printing apparatus 106 receives one page of the high-resolution JPEG image corresponding to a page of the document file, the printing apparatus 106 can perform the print processing up to the discharge of a sheet on which the page is printed.

In step S1427, the data processing apparatus 101 determines whether an operation to execute the cancellation is performed by the user before completion of the transmission of the print job to the printing apparatus 106. Execution of the cancellation by the user is triggered by the press of the cancel button 1203 illustrated in FIG. 12. If the cancellation is executed by the user before completion of the transmission of the print job (YES in step S1427), the processing proceeds to step S1411, and the user interface is brought back to the state illustrated in FIG. 11. On the other hand, if the cancellation is not executed by the user (NO in step S1427), it is determined that the transmission of the print job is completed, the processing proceeds to step S1428.

Step S1428 is similar to step S1015 in the first exemplary embodiment.

By the foregoing processing, even when the data processing apparatus can select a plurality of types of printing apparatuses, if the type of the printing apparatus at the timing of the user pressing the document file conversion execution button is the same as the type of the printing apparatus at the timing of the user pressing the print execution button, a print job can be generated based on the data that is being downloaded or has already been downloaded, thereby producing an advantage similar to that produced according to the first exemplary embodiment. That is, the time from the press of the print execution button by the user to the start of the operation of the printing apparatus can be reduced.

The above-described exemplary embodiments can be realized by a process in which a program for realizing one or more functions of the foregoing exemplary embodiments is supplied to a system or apparatus via a network or storage medium and one or more processors of a computer of the system or apparatus reads and executes the program. Further, the exemplary embodiments can also be realized by a circuit (e.g., application specific integrated circuit (ASIC)) realizing one or more functions.

The exemplary embodiments can provide a printing method that is highly convenient to users. More specifically, the exemplary embodiments can provide a printing method in which download of print data is started based on existing print settings and then processing is switched depending on whether print data needs to be re-downloaded based on changed print settings.

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been generally described with reference to exemplary embodiments, it is to be understood that these exemplary embodiments are not seen to be limiting. The scope of the following claims is to be accorded the broadest interpretation so as to encompass all such modifications and equivalent structures and functions.

While aspects of the present invention have been generally described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-174491 filed Aug. 28, 2014, which is hereby incorporated by reference herein in its entirety.

What is claimed is:

1. A data processing apparatus comprising:
at least a processor and at least a memory coupled to the at least the processor and having stored thereon instructions for causing, when executed by the at least the processor, the at least the processor and the at least the memory to cooperate to act as:
a processing unit configured to start processing for downloading first print data and at least one page of an image for a preview from an external apparatus, the first print data being generated based on a first print setting;
a reception unit configured to receive a change from the first print setting to a second print setting;
a display unit configured to display a print execution button in a state where reception of a print execution instruction is disabled, and if a preview execution instruction is received and if the at least one page of the image for the preview is downloaded, the display unit displays the print execution button in a state where the reception of the print execution instruction is enabled; and
a transmission unit configured to transmit to a printing apparatus a print job based on downloaded print data if the print execution instruction is received,
wherein if the reception unit receives the change from the first print setting to the second print setting and if second print data based on the second print setting needs to be downloaded from the external apparatus, the processing unit stops the processing for downloading the first print data and starts processing for downloading the second print data from the external apparatus, and the transmission unit transmits a print job based on the second print data to the printing apparatus, and
wherein if the reception unit receives the change from the first print setting to the second print setting and if the second print data does not need to be acquired from the external apparatus, the transmission unit transmits a print job based on the first print data and the second print setting to the printing apparatus.

2. The data processing apparatus according to claim 1, wherein if a preview execution instruction is received, the processing unit downloads the image for the preview and the first print data,
wherein the display unit is further configured to display a preview based on the image for the preview, and
wherein if the print execution instruction is received after the preview is displayed, the transmission unit transmits the print job based on the first print data or the second print data to the printing apparatus.

3. The data processing apparatus according to claim 2, further comprising a determination unit configured to determine whether a target printing apparatus is a first printing apparatus or a second printing apparatus,
wherein the processing unit downloads the image for the preview and the first print data if the determination unit determines that the target printing apparatus is the first printing apparatus and if the preview execution instruction is received, and the processing unit downloads the first print data to be used for both the preview and printing if the determination unit determines that the target printing apparatus is the second printing apparatus and if the preview execution instruction is received.

4. The data processing apparatus according to claim 1, wherein the processing unit uploads a document file and downloads the first print data based on the first print setting and the document file, and if the second print data needs to be downloaded from the external apparatus, the processing unit downloads the second print data based on the second print setting and the document file from the external apparatus.

5. The data processing apparatus according to claim 1, further comprising a determination unit configured to determine whether the change from the first print setting to the second print setting is within a range having no effect on the first print data,
wherein if the determination unit determines that the change from the first print setting to the second print setting is not within the range having no effect on the first print data, the processing unit downloads the second print data from the external apparatus.

6. The data processing apparatus according to claim 5, wherein if a specific print setting item is not changed, the determination unit determines that the change from the first print setting to the second print setting is within the range having no effect on the first print data.

7. A method for controlling a data processing apparatus, the method comprising:
starting processing for downloading first print data and at least one page of an image for a preview from an external apparatus, the first print data being generated based on a first print setting;
receiving a change from the first print setting to a second print setting;
displaying a print execution button in a state where reception of a print execution instruction is disabled, and if a preview execution instruction is received and if the at least one page of the image for the preview is downloaded, displays the print execution button in a state where the reception of the print execution instruction is enabled; and
transmitting to a printing apparatus a print job based on downloaded print data if the print execution instruction is received,
wherein if the change from the first print setting to the second print setting is received and if second print data based on the second print setting needs to be downloaded from the external apparatus, the processing for downloading the first print data is stopped and processing for downloading the second print data from the external apparatus is started, and a print job based on the second print data is transmitted to the printing apparatus, and
wherein if the change from the first print setting to the second print setting is received and if the second print data does not need to be acquired from the external apparatus, a print job based on the first print data and the second print setting is transmitted to the printing apparatus.

8. The method according to claim 7, wherein if a preview execution instruction is received, the image for the preview and the first print data are downloaded,
wherein the method further comprises displaying a preview based on the image for the preview, and
wherein if the print execution instruction is received after the preview is displayed, the print job based on the first print data or the second print data is transmitted to the printing apparatus.

9. The method according to claim 8, further comprising determining whether a target printing apparatus is a first printing apparatus or a second printing apparatus,
wherein the image for the preview and the first print data are downloaded if it is determined that the target printing apparatus is the first printing apparatus and if the preview execution instruction is received, and the first print data to be used for both the preview and printing is downloaded if it is determined that the target printing apparatus is the second printing apparatus and if the preview execution instruction is received.

10. The method according to claim 7, wherein a document file is uploaded and the first print data based on the first print setting and the document file is downloaded, and if the second print data needs to be downloaded from the external apparatus, the second print data based on the second print setting and the document file is downloaded from the external apparatus.

11. The method according to claim 7, further comprising determining whether the change from the first print setting to the second print setting is within a range having no effect on the first print data,
wherein if it is determined that the change from the first print setting to the second print setting is not within the range having no effect on the first print data, the second print data is downloaded from the external apparatus.

12. The method according to claim 11, wherein if a specific print setting item is not changed, it is determined that the change from the first print setting to the second print setting is within the range having no effect on the first print data.

13. A non-transitory computer-readable storage medium storing computer executable instructions for causing a computer to execute a method for controlling a data processing apparatus, the method comprising:
starting processing for downloading first print data and at least one page of an image for a preview from an external apparatus, the first print data being generated based on a first print setting;
receiving a change from the first print setting to a second print setting;
displaying a print execution button in a state where reception of a print execution instruction is disabled, and if a preview execution instruction is received and if the at least one page of the image for the preview is downloaded, displays the print execution button in a state where the reception of the print execution instruction is enabled; and
transmitting to a printing apparatus a print job based on downloaded print data if the print execution instruction is received,
wherein if the change from the first print setting to the second print setting is received and if second print data based on the second print setting needs to be downloaded from the external apparatus, the processing for downloading the first print data is stopped and processing for downloading the second print data from the external apparatus is started, and a print job based on the second print data is transmitted to the printing apparatus, and
wherein if the change from the first print setting to the second print setting is received and if the second print data does not need to be acquired from the external apparatus, a print job based on the first print data and the second print setting is transmitted to the printing apparatus.

* * * * *